(12) United States Patent
Xin et al.

(10) Patent No.: US 12,465,245 B2
(45) Date of Patent: Nov. 11, 2025

(54) METHOD OF FABRICATING METASURFACE ON SKIN FOR BLOOD GLUCOSE DETECTION

(71) Applicant: BEIJING INSTITUTE OF GRAPHIC COMMUNICATION, Beijing (CN)

(72) Inventors: Zhiqing Xin, Beijing (CN); Qingfang Zhang, Beijing (CN); Yan Li, Beijing (CN); Yi Fang, Beijing (CN); Zhicheng Sun, Beijing (CN); Min Huang, Beijing (CN); Xiu Li, Beijing (CN); Lixin Mo, Beijing (CN); Luhai Li, Beijing (CN)

(73) Assignee: BEIJING INSTITUTE OF GRAPHIC COMMUNICATION, Beijing (CN)

( * ) Notice: Subject to any disclaimer, the term of this patent is extended or adjusted under 35 U.S.C. 154(b) by 539 days.

(21) Appl. No.: 17/920,035

(22) PCT Filed: Nov. 23, 2020

(86) PCT No.: PCT/CN2020/130933
§ 371 (c)(1),
(2) Date: Oct. 20, 2022

(87) PCT Pub. No.: WO2022/000956
PCT Pub. Date: Jan. 6, 2022

(65) Prior Publication Data
US 2023/0158822 A1    May 25, 2023

(30) Foreign Application Priority Data

Jul. 3, 2020 (CN) .......................... 202010638269.8

(51) Int. Cl.
*A61B 5/145*       (2006.01)
*A61B 5/1455*      (2006.01)
(Continued)

(52) U.S. Cl.
CPC ........ *A61B 5/14532* (2013.01); *A61B 5/1455* (2013.01); *B41M 1/12* (2013.01);
(Continued)

(58) Field of Classification Search
CPC .............. A61B 5/14532; A61B 5/1455; A61B 2562/0233–0238;
(Continued)

(56) References Cited

U.S. PATENT DOCUMENTS 9,408,564 B2 *  8/2016  Porch ................... A61B 5/0507
11,039,769 B2 *  6/2021  Guarin ................. A61B 5/0537

FOREIGN PATENT DOCUMENTS

CN    107356613 A  * 11/2017  ............. G01N 22/00
CN    109171671 A  *  1/2019  ............... A61B 5/02
(Continued)

OTHER PUBLICATIONS

English Translation—CN 10356613 A.*
(Continued)

*Primary Examiner* — Adam J Eiseman

(57) ABSTRACT

A method of fabricating metasurface on skin for blood glucose detection, which relates to a flexible wearable electronic technology in healthcare. The blood glucose detection comprises: designing metasurface with a resonant ring structure cell, and building a model by simulating a relationship between blood glucose concentration and electromagnetic absorption property of the metasurface; preparing the metasurface on the skin; scanning the metasurface on the skin under different frequencies electromagnetic wave and acquiring a relationship curve between S-11 parameter and frequency; the change of blood glucose concentration is determined according to the resonant peak frequency shift in the relationship curve based on the model. It realizes the electromagnetic wave metasurface with a good skin bio-
(Continued)

compatibility, a stable electromagnetic property and a high glucose detection accuracy is directly structured on the skin, moreover, it can directly measure human blood glucose concentration without sampling human blood, realizing real non-invasive human blood glucose detection.

9 Claims, 3 Drawing Sheets

(51) Int. Cl.
    *B41M 1/12*         (2006.01)
    *B41M 5/025*       (2006.01)
    *B41M 5/03*        (2006.01)

(52) U.S. Cl.
    CPC .............. *B41M 5/025* (2013.01); *B41M 5/03* (2013.01); *A61B 2562/164* (2013.01)

(58) Field of Classification Search
    CPC . A61B 2562/0261–0266; A61B 2562/12–125; B41M 5/025; B41M 5/0256; B41M 5/03
    USPC ........................................................ 600/316
    See application file for complete search history.

(56) References Cited

FOREIGN PATENT DOCUMENTS

| CN | 113518585 A | * | 10/2021 | ........... A61B 5/0507 |
|---|---|---|---|---|
| KR | 20200077757 | * | 7/2020 | ........... A61B 5/6801 |
| WO | WO-2019135478 A1 | * | 7/2019 | ........... A61B 5/0507 |
| WO | WO-2020176857 A1 | * | 9/2020 | ........... A61B 5/0507 |

OTHER PUBLICATIONS

English Translation—CN 109171671 A.*
English Translation—CN 113518585 A.*
English Translation—KR 20200077757.*
English Translation—WO2019/135478 A1.*
International Search Report of PCT Patent Application No. PCT/CN2020/130933 issued on Apr. 1, 2021.

* cited by examiner

S100

- S110: design a metasurface with a resonant ring structure cell, and build a model by simulating a relationship between blood glucose concentration and electromagnetic absorption property of the metasurface

- S120: prepare the metasurface on the skin

- S130: scan the metasurface formed on the skin and acquire reflection spectra of the metasurface under electromagnetic wave with different frequencies, thereby obtaining a relationship curve between S-11 parameter and frequency

- S140: determine change of blood glucose concentration as a function of resonant peak frequency shift in the relationship curve based on the model

Fig. 1

S120 prepare a stretchable composite conductive ink using preset liquid metal particulates, preset metal particles, and preset elastic resin. — S121 print the stretchable composite conductive ink onto water transfer paper by screen printing, and apply preset treating pressure against the stretchable conductive ink layer printed on the water transfer paper for a preset duration after the ink is dry, such that shells of the liquid metal particulates in the stretchable composite conductive ink layer are cracked, and liquid metal particulates in the shell flow out to connect adjacent metal particles, thereby obtaining the metasurface on the water transfer paper; — S122 transfer the metasurface on the water transfer paper onto the skin via a water transfer printing process, whereby to form the metasurface on the skin — S123

Fig. 2

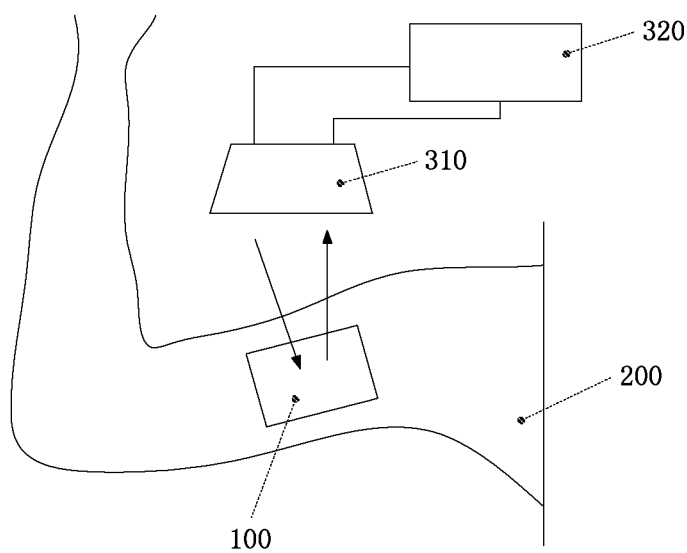

Fig. 3

METHOD OF FABRICATING METASURFACE ON SKIN FOR BLOOD GLUCOSE DETECTION

FIELD

The present disclosure relates to a flexible wearable electronic technology in healthcare, and more particularly relates to a method of fabricating metasurface on skin for blood glucose detection.

BACKGROUND

Diabetes has become a major chronic disease threatening health and life of modern people, and self-monitoring of blood glucose (SMBG) is an important part in diabetes management. In current clinical practices, the blood glucose readings are measured with a glucometer by finger pricking, which causes pain and potential bacterial infection to patients. Researchers have developed a wearable patch-type glucometer which realizes minimally invasive glucose measurement by applying an electrochemical testing to subcutaneous tissue fluid; however, this approach still needs an invasive procedure for multiple times of calibration. Therefore, it is significant to develop a painless, highly accurate non-invasive blood glucose detection technology.

Change of glucose concentration in the blood has an impact on blood dielectric properties, therefore, the glucose concentration exhibits a characteristic of response to electromagnetic signals, which allows for electromagnetic-wave-based, non-invasive blood glucose detection. So the key of this approach is to accurately measure the electromagnetic properties of the blood. Conventionally, a co-axial probe serves as the sensor to monitor the electromagnetic constants of blood. However, the co-axial probe is insensitive to slight changes of blood glucose concentration, which leads to a low testing accuracy. Moreover, the object under test is fluid in this approach, which needs taking blood sample and thus cannot achieve wholly non-invasive glucose measurement. Metasurface, which has a highly sensitive response property and a strong manipulability with respect to the phase and amplitude of electromagnetic wave, may accurately express the glucose's characteristics in reflecting or transmitting electromagnetic waves. Current studies on metasurface-based glucose level measurement using electromagnetic wave include that a metasurface is structured on a specific substrate then depositing human blood onto its surface to test, or attaching a metasurface-structured substrate onto the skin to test. However, the former study still needs extracting blood sample, and the latter study likely causes relative displacement between the substrate and the skin, causing electromagnetic noise and deteriorated detection accuracy.

In view of the above, the key to realize non-invasive blood glucose detection by electromagnetic metasurface is that how directly fabricate electromagnetic metasurface on the skin with a convenient fast manner, and the resulting metasurface shows good biocompatibility with the skin and stable performance. It is necessary to develop a new method of fabricating electromagnetic metasurface on skin.

SUMMARY

To solve at least one of the technical problems in conventional technologies, the present disclosure provides a method of fabricating metasurface on skin for blood glucose detection.

The method of fabricating metasurface on skin for blood glucose detection comprises:
  designing a metasurface with a resonant ring structure cell, and building a model by simulating a relationship between blood glucose concentration and electromagnetic absorption property of the metasurface;
  preparing the metasurface on the skin;
  scanning the metasurface formed on the skin and acquiring reflection spectra of the metasurface under electromagnetic wave with different frequencies, thereby obtaining a relationship curve between S-11 parameter and frequency.
  determining a change of the blood glucose concentration as a function of frequency shift of resonant peak in the relationship curve based on the built model.

Optionally, the resonant ring structure refers to a split-ring-resonator structure which has a round or square shape, and the split-ring-resonator structure has a linewidth ranging from 0.5 mm to 5 mm and a gap width ranging from 1 mm to 10 mm; and/or,
  the magnetic wave has a wavelength at a millimeter level and a frequency ranging from 30 GHz to 300 GHz.

Optionally, the preparing the metasurface on the skin comprises:
  preparing a stretchable composite conductive ink using preset liquid metal particulates, preset metal particles, and preset elastic resin;
  printing the stretchable composite conductive ink onto water transfer paper by screen printing, and after the stretchable composite conductive ink layer is dry, applying a preset treating pressure against the stretchable conductive ink layer printed on the water transfer paper for a preset duration, such that shells of the liquid metal particulates in the stretchable composite conductive ink layer are cracked, and the liquid metal particulates flow out to connect the adjacent metal particles, thereby obtaining the metasurface on the water transfer paper; and
  transferring the metasurface on the water transfer paper onto the skin via a water transfer printing process, whereby to form the metasurface on the skin.

Optionally, for the stretchable composite conductive ink, the mass fraction of the liquid metal particulates ranges from 1% to 15%, the mass fraction of the silver particles ranges from 60% to 80%, and the mass fraction of the elastic resin ranges from 5% to 39%.

Optionally, the liquid metal particulates are selected from eutectic gallium-indium nanoparticles or eutectic gallium-indium-tin alloy nanoparticles.

Optionally, the liquid metal particulates have a diameter ranging from 50 nm to 1000 nm.

Optionally, the silver particles are selected from at least one of silver microflakes, silver nanoflakes and silver microparticles.

Optionally, the elastic resin is selected from any one of polydimethylsiloxane, polyurethane, silica gel, styrene-butadiene-styrene block copolymer, and styrene-ethylene-butadiene-styrene block copolymer.

Optionally, the applying a preset treating pressure against the stretchable conductive ink layer printed on the water transfer paper for a preset duration, such that shells of the liquid metal particulates in the stretchable composite conductive ink layer are cracked, and the liquid metal particulates flow out to connect the adjacent silver particles, thereby obtaining the metasurface on the water transfer paper, comprises:

applying a preset treating pressure ranging from 10N to 100N against the stretchable conductive ink layer printed on the water transfer paper for 1 min to 2 min, such that shells of the liquid metal particulates in the stretchable composite conductive ink layer are cracked, and the liquid metal particulates flow out to connect the adjacent metal particles, thereby obtaining the metasurface on the water transfer paper.

Optionally, the transferring the metasurface on the water transfer paper onto the skin via a water transfer printing process, comprises:

wetting the metasurface on the water transfer paper with water, attaching the wet paper on the skin, and treating for 1 to 5 minutes under a pressure ranging from 10 Pa to 800 Pa, whereby to transfer the metasurface onto the skin.

The disclosure provides a method of fabricating metasurface on skin for blood glucose detection, comprising, designing a metasurface with resonant ring structure cell; building a model by simulating a relationship between a blood glucose concentration and an electromagnetic absorption property of the metasurface; preparing the metasurface on the skin; scanning the metasurface formed on the skin, and acquiring reflection spectra of the metasurface under electromagnetic wave with different frequencies, thereby obtaining a relationship curve between S-11 parameter and frequency; and determining a change of the blood glucose concentration as a function of frequency shift of the resonant peak in the relationship curve based on the model. The present disclosure may directly structure an electromagnetic-wave metasurface on the skin in a simple convenient manner, the acquired deformable metasurface having a good biocompatibility with the skin, deformable and a stable performance; moreover, the metasurface may directly measure human body blood glucose based on the relationship between an electromagnetic absorption property and a blood glucose concentration, which can directly measure human blood glucose concentration without sampling human blood, and realizes wholly non-invasive blood glucose detection.

BRIEF DESCRIPTION OF THE DRAWINGS

FIG. 1 is a flow diagram of a method of fabricating metasurface on skin for blood glucose detection according to an embodiment of the present disclosure;

FIG. 2 is a flow diagram of preparing metasurface on skin according to another embodiment of the present disclosure;

FIG. 3 is a schematic diagram for blood glucose detection using metasurface on skin according to a further embodiment of the present disclosure.

DETAILED DESCRIPTION

Figure 4:
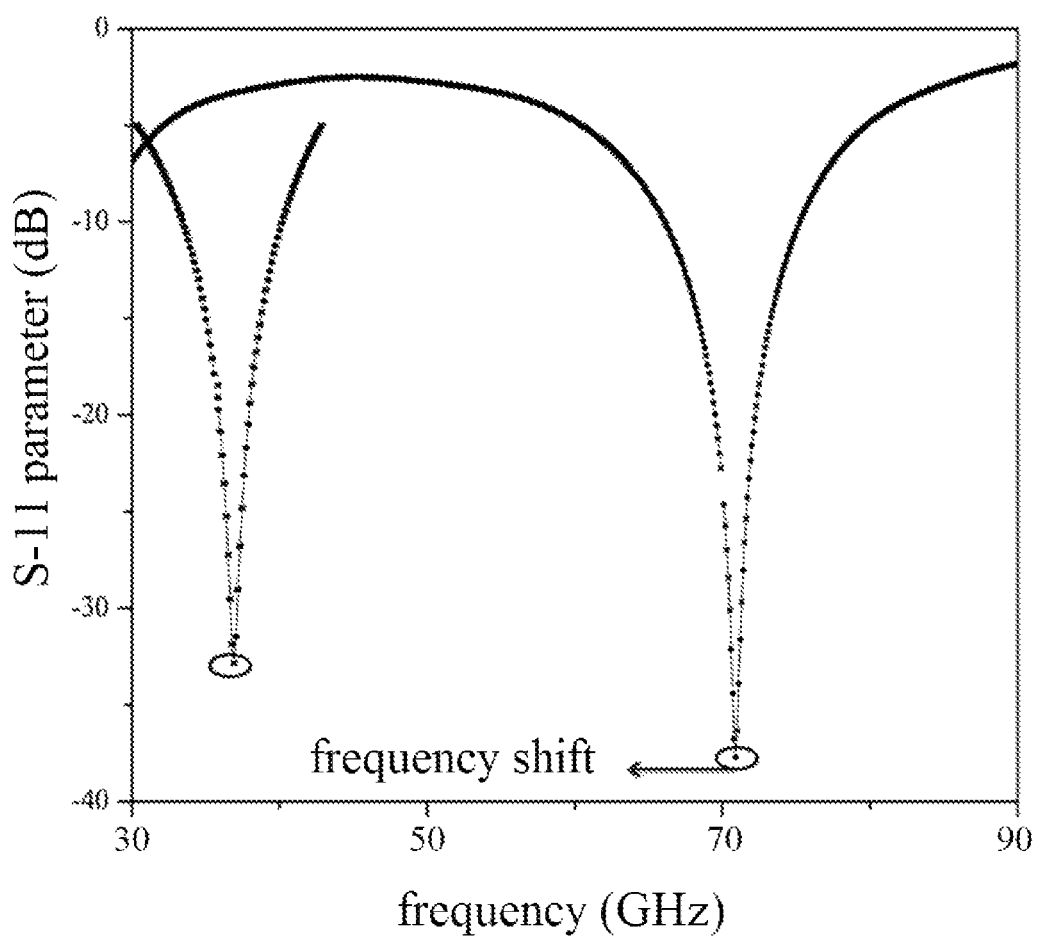
FIG. 4 is a reflection coefficient diagram of the metasurface on skin under different frequencies according to a still another embodiment of the present disclosure.

In order to better understand the technical solution of the present disclosure, some embodiments of the present disclosure will be described with reference to the accompanying drawings in further detail below. Apparently, the embodiments described herein are only a part of the embodiments of the present disclosure, not all of them. All other embodiments derived by the persons skilled in the art based on those described herein without exercise of inventive work fall within the protection scope of the present disclosure.

As illustrated in FIG. 1, the present disclosure provides a method S100 of fabricating metasurface on skin for blood glucose detection, which specifically comprises steps S110 to S140 set forth below:

S110: designing a metasurface with a resonant ring structure cell, and building a model by simulating a relationship between blood glucose concentration and electromagnetic absorption property of the metasurface.

Specifically, in this embodiment, the metasurface with a resonant ring structure cell may be designed using multiphysics simulation software; moreover, the resonant ring structure is a split-ring-resonator structure having a circular or square shape, a linewidth ranging from 0.5 mm to 5 mm, and a gap width ranging from 1 mm to 10 m, which are not specifically limited herein.

Of course, those skilled in the art may also design a complementary split-ring-resonator or other types dependent on actual needs, which will not be specifically limited here.

It is noted that the metasurface in this embodiment is a layered material with a thickness less than the wavelength; since the metasurface has a highly sensitive response property and a strong manipulability to the phase and amplitude of electromagnetic wave, it may accurately sense the glucose's characteristics in reflecting and transmitting electromagnetic wave, such that the metasurface may be used to sense blood glucose concentrations of human body. It should be understood that prior to the measurement, a model needs to be built by simulating a relationship between an electromagnetic absorption property of the metalsurface and blood glucose concentration of human body, which is used for comparative analysis with subsequent measurements.

It needs to be further noted that some dimension parameters of the resonant ring structure need to be inputted in the simulation model so as to facilitate designing of the dimensions of the resonant ring structure cell in the metasurface. Meanwhile, during the simulation, the dielectric constant of the blood glucose is inputted to simulate the reflection spectra of the metasurface with a critical dimension under different frequencies; moreover, the dielectric constant of the blood glucose is correlated with the glucose concentration, and based on such a correlation, a model reflecting the relationship between glucose concentration and electromagnetic absorption property of the metasurface may be built.

S120: preparing the metasurface on the skin

It needs to be noted that an electromagnetic-wave metasurface is conventionally fabricated on a silicon wafer or other substrates, the testing is fulfilled either by dripping simulated human blood glucose onto the surface of the metasurface or by attaching the metasurface to the skin. The former approach requires simulated blood glucose by using glucose solution, and in the case of detection human blood glucose, it requires invasively extracting blood sample; while the latter approach has a relatively large error mainly caused by the gap between the skin and the metasurface on the skin where is filled with air; therefore, the metasurface fabrication is critical to accurate detection, which requires eliminating the gap between the skin and the metasurface. So, a water transfer printing (WTP) process is employed in this embodiment to form a conductive pattern on the skin for metasurface; in this way, the resulting metasurface has no gap from the skin, which may be used to directly measure the human blood glucose level without finger pricking.

Exemplarily in conjunction with FIG. 3, there is illustrated a metasurface 100 formed on the skin of human arm 200. The metasurface 100 has a good biocompatibility with the skin, and may be tightly attached onto the skin.

Specifically, as illustrated in FIG. 2, the S120 of preparing the metasurface on the skin comprises steps S121 to S123:

S121: preparing a stretchable composite conductive ink using preset liquid metal particulates, preset metal particles, and preset elastic resin.

It is noted that the proportion of the three compositions in the stretchable conductive ink may be adjusted depending on actual needs, which is not specifically limited herein. Exemplarily in this embodiment, the mass fraction of the liquid metal particulates ranges from 1% to 15%, the mass fraction of the metal particles ranges from 60% to 80%, and the mass fraction of the elastic resin ranges from 5% to 39%. In this way, the preset liquid metal particulates, the preset metal particles and the preset elastic resin are mixed according to a predetermined proportion and stirred homogeneously so as to satisfy screen printing process acquirement.

Specifically, in some embodiments, the mass fraction of the liquid metal particulates may be set to 5%, the mass fraction of the metallic particles may be set to 70%, and the mass faction of the elastic resin may be set to 25%.

It is further noted that the preset liquid metal particulates may be eutectic gallium-indium nanoparticles or eutectic gallium-indium-tin alloy nanoparticles, wherein the diameter of the liquid metal particulate ranges from 50 nm to 1000 nm; and the metal particles may be silver particles, wherein the silver particles may be selected from one or more of silver microflakes, silver nanoflakes and silver microparticles. In addition, the elastic resin in this example may be selected from any of polydimethylsiloxane, polyurethane, silica gel, styrene-butadiene-styrene block copolymer and styrene-ethylene-butadiene-styrene block copolymer, which is not specifically limited here. Those skilled in the art may select a specific one dependent on actual needs.

S122: printing the stretchable composite conductive ink onto water transfer paper by screen printing, and after the stretchable composite conductive ink layer is dried, applying a preset treating pressure against the ink layer for a preset duration, such that shells of the liquid metal particulates in the ink layer are cracked, and the liquid metal particulates in the shell flow out to connect the adjacent silver particles, thereby obtaining the metasurface on the water transfer paper.

It is noted that the preset treating pressure applied against the printed ink layer that comprises the liquid metal particulates and the silver particles in step S122 ranges from 10N to 100N, and the treating duration ranges from 1 min to 2 min; this may ensure stretchability and conductivity of the metasurface transferred onto the skin; and the sheet resistance of the line of the split-ring-resonator after treating is less than 100 Ω/sq.

S123: transferring the metasurface on the water transfer paper onto the skin via a water transfer printing process, whereby to form the metasurface on the skin.

Specifically, during this step, a water transfer printing process may be applied to transfer the structural pattern of the metasurface resonant ring onto human skin (e.g., arm surface) by wetting the structural pattern of the metasurface with water on the water transfer paper, attaching the wet paper on the skin, and treating for 1 min to 5 min under the pressure ranging from 10 Pa to 800 Pa, whereby to fabricate a metasurface that may withstand certain deformation of the human skin. The water transfer printing process applied in this embodiment may effectively solve the issue that the metamaterial cannot be flatly attached to a complex curved surface. In this way, the metasurface may be formed on the skin at any body positions to realize non-invasive measurement of blood glucose concentration.

It is noted that human body deformations include stretching, bending, etc., and the electric properties of the pattern of resonant ring structure on the metasurface maintains unchanged during the above body deformations. In other words, the electric properties of the metasurface prepared on the skin do not change with body deformations, which may effectively avoid the impact of body deformation on the detection process, thereby further effectively reducing measurement errors.

In the method of this embodiment, electromagnetic wave metasurface on the skin can be fabricated by screen printing the stretchable conductive ink on the water transfer paper to obtain a metasurface structure and by transferring the metasurface structure onto the skin from the water transfer paper via a water transfer printing process. The resulting electromagnetic-wave metasurface has a good biocompatibility and a stable conductivity, and may withstand certain body deformation. This technique of fabricating a metasurface on the skin is currently novel; while the metasurface is generally structured on a certain substrate by etching or printing. In contrast, the method in this embodiment may realize direct fabrication of metasurface on the skin, and the metasurface is tightly attached to the skin to realize non-invasive blood glucose detection.

S130. acquiring reflection spectra by scanning the metasurface formed on the skin using electromagnetic wave with different frequencies, whereby to obtain a relationship curve between S-11 (reflection coefficient) parameter and frequency.

FIG. 4 shows a curve regarding change of the S-11 parameter of the metasurface with the frequency, wherein the blood glucose concentration change of the human body may be obtained based on the relationship curve and the built model.

It is noted that the wavelength of the electromagnetic wave used in this embodiment is at a millimeter level, with its frequency ranging between 30 GHz and 300 GHz, such that the feature size of the resonant ring structure cell in the metasurface operating at the frequency is easily defined on the skin.

S140. determining a blood glucose concentration change as a function of resonant peak frequency shift in the relationship curve based on the model.

Specifically, a blood glucose concentration change is determined as a function of the relationship curve between the S-11 parameter and the frequency obtained in step S130 based on the model built in step S110. Exemplarily, as illustrated in conjunction with FIG. 4, the resonant peak of S-11 parameter shifts from the high frequency band to the low frequency band, and then the change of the blood glucose concentration may be derived based on the model simulated in step S110. In other words, the frequency shift of the resonant peak of S-11 parameter and the change of the blood glucose concentration have a corresponding relation; therefore, change of the blood glucose concentration may be directly derived based on the frequency shift.

The testing method in this embodiment needn't extract a blood sample; the blood glucose concentration may be directly measured by fabricating a metasurface on the skin and by effectively controlling the electromagnetic wave using the metasurface, whereby to realize non-invasive measurement of human body blood glucose.

Exemplarily, FIG. 3 illustrates the fabricated metasurface 100 on the skin of a human arm 200; a radar antenna 310 is arranged at an appropriate position above the metasurface;

the radar antenna 310 is further connected with a vector network analyzer 320 so as to excite the metasurface via a radiation field of radar antenna, wherein an electromagnetic reflection feature curve (as illustrated in FIG. 4) of the metasurface may be obtained using the vector network analyzer 320. The disclosure avoids the pain and discomfort caused by blood sampling for conventional testing methods; besides, the metasurface is tightly attached to the skin, which avoids the issues such as electromagnetic noise and deteriorated measurement accuracy due to relative displacement between the substrate and the skin occurring in a conventional detection method of blood glucose concentration that was characterized by fabricating the metasurface on the substrate and then attaching the substrate to the skin.

The disclosure provides a method of fabricating metasurface on skin for blood glucose detection. Compared with conventional technologies, the present disclosure offers the following benefits: an electromagnetic-wave metasurface is structured on the skin by screen printing the stretchable conductive ink onto a water transfer paper to obtain a metasurface structure and then transferring the metasurface structure onto the skin via a water transfer printing process, the resulting electromagnetic-wave metasurface has a good biocompatibility and a stable electromagnetic property and is capable of withstanding certain body deformation. Secondly, by measuring the electromagnetic response feature curve of the metasurface on the skin to millimeter-wave, change of the human body blood glucose concentration may be accurately obtained as a function of the resonant peak frequency shift in the curve in conjunction with the simulation result. The method of blood glucose concentration detection according to the present disclosure may realize in-vivo, non-invasive blood glucose measurement at any position of a human body skin, which eliminates the need of extracting a blood sample while offering high testing efficiency and safety without affecting movement of the human body and normal life.

It may be appreciated that the embodiments above are only examples for illustrating the principle of the present disclosure. However, the present disclosure is not limited thereto. To those of normal skill in the art, various alterations and modifications may be made without departing from the spirit and substance of the present disclosure, and all of such alternations and modifications are regarded as falling into the protection scope of the present disclosure.

What is claimed is:

1. A method of fabricating metasurface on skin for blood glucose detection, comprising:
   designing a metasurface with a resonant ring structure cell, and building a model by simulating a relationship between blood glucose concentration and electromagnetic absorption property of the metasurface;
   preparing the metasurface on the skin;
   scanning the metasurface formed on the skin and acquiring reflection spectra of the metasurface under electromagnetic wave with different frequencies, thereby obtaining a relationship curve between S-11 parameter (reflection coefficient) and frequency; and
   determining change of blood glucose concentration as a function of resonant peak frequency shift in the relationship curve based on the model;
   wherein the preparing the metasurface on the skin comprises:
   preparing a stretchable composite conductive ink using preset liquid metal particulates, preset metal particles, and preset elastic resin;
   printing the stretchable composite conductive ink onto water transfer paper by screen printing, and applying preset treating pressure against the stretchable conductive ink layer printed on the water transfer paper for a preset duration after the ink is dry, such that shells of the liquid metal particulates in the stretchable composite conductive ink layer are cracked, and liquid metal particulates in the shell flow out to connect adjacent metal particles, thereby obtaining the metasurface on the water transfer paper; and
   transferring the metasurface on the water transfer paper onto the skin via a water transfer printing process, whereby to form the metasurface on the skin.

2. The method of claim 1, wherein the resonant ring structure refers to a split-ring-resonator structure with a round or square shape, and the split-ring-resonator structure has a linewidth ranging from 0.5 mm to 5 mm and a gap width ranging from 1 mm to 10 mm; and/or,
   the electromagnetic wave has a wavelength at a millimeter level and a frequency ranging between 30 GHz and 300 GHz.

3. The method of claim 1, wherein in the stretchable composite conductive ink, the mass fraction of the liquid metal particulates ranges from 1% to 15%, the mass fraction of the metal particles ranges from 60% to 80%, and the mass fraction of the elastic resin ranges from 5% to 39%.

4. The method of claim 3, wherein the liquid metal particulates are selected from eutectic gallium-indium nanoparticles or eutectic gallium-indium-tin nanoparticles.

5. The method of claim 4, wherein the liquid metal particulates have a diameter ranging from 50 nm to 1000 nm.

6. The method of claim 1, wherein the metal particles are selected from at least one of silver microflakes, silver nanoflakes and silver microparticles.

7. The method of claim 1, wherein the elastic resin is selected from any one of polydimethylsiloxane, polyurethane, silica gel, styrene-butadiene-styrene block copolymer, and styrene-ethylene-butadiene-styrene block copolymer.

8. The method of claim 1, wherein the applying a preset treating pressure against the stretchable conductive ink layer printed on the water transfer paper to treat for a preset duration, such that shells of the liquid metal in the stretchable composite conductive ink layer are cracked, and the liquid metal particulates flow out to connect adjacent metal particles, thereby obtaining the metasurface on the water transfer paper, comprises:
   applying a preset treating pressure ranging from 10N to 100N against the stretchable conductive ink layer printed on the water transfer paper and treating for 1 min to 2 min, such that shells of the liquid metal particulates in the stretchable composite conductive ink layer are cracked, and the liquid metal particulates flow out to connect adjacent metal particles, thereby obtaining the metasurface on the water transfer paper.

9. The method of claim 1, wherein the transferring the metasurface on the water transfer paper onto the skin in a water transfer printing process comprises:
   wetting the metasurface on the water transfer paper with water, attaching the wet paper on the skin, and treating for 1 to 5 minutes under a pressure ranging from 10 Pa to 800 Pa, whereby to transfer the metasurface onto the skin.

* * * * *